(12) United States Patent
Stergiou et al.

(10) Patent No.: US 9,405,819 B2
(45) Date of Patent: Aug. 2, 2016

(54) EFFICIENT INDEXING USING COMPACT DECISION DIAGRAMS

(75) Inventors: Stergios Stergiou, Sunnyvale, CA (US); Jawahar Jain, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1250 days.

(21) Appl. No.: 12/026,897

(22) Filed: Feb. 6, 2008

(65) Prior Publication Data

US 2008/0243907 A1 Oct. 2, 2008

Related U.S. Application Data

(60) Provisional application No. 60/899,874, filed on Feb. 7, 2007.

(51) Int. Cl.
G06F 17/30 (2006.01)
G06N 5/00 (2006.01)

(52) U.S. Cl.
CPC .......... *G06F 17/30613* (2013.01); *G06N 5/003* (2013.01)

(58) Field of Classification Search
USPC ............................... 709/223; 707/1, 2, 3, 102
See application file for complete search history.

(56) References Cited

U.S. PATENT DOCUMENTS

| | | | |
|---|---|---|---|
| 6,285,999 B1 | 9/2001 | Page | |
| 6,651,096 B1* | 11/2003 | Gai et al. | 709/223 |
| 6,799,176 B1 | 9/2004 | Page | |
| 7,058,628 B1 | 6/2006 | Page | |
| 7,216,312 B2 | 5/2007 | Jain et al. | |
| 7,647,299 B2* | 1/2010 | Harik | |
| 2002/0091671 A1* | 7/2002 | Prokoph | 707/1 |
| 2004/0093571 A1 | 5/2004 | Jain et al. | |
| 2004/0205044 A1* | 10/2004 | Su et al. | 707/2 |
| 2004/0260667 A1* | 12/2004 | Huelsman et al. | 706/47 |
| 2005/0171747 A1* | 8/2005 | Franco et al. | 703/2 |

OTHER PUBLICATIONS

Compressing Inverted Files in Scalable Information Systems by Binary Decision Diagram Encoding, Chung-Hung Lai and Tien-Fu Chen, Nov. 2001.*
Brace, et al. "Efficient Implementation of a BDD Package," 1990 IEEE, Paper 3.1, 27th ACM/IEEE Design Automation Conference, pp. 40-45, 1990.
Japanese Office Action with English translation; Application No. 2008-028072; pp. 5, Oct. 9, 2012.

(Continued)

*Primary Examiner* — Sherief Badawi
*Assistant Examiner* — Christopher J Raab
(74) *Attorney, Agent, or Firm* — Baker Botts L.L.P.

(57) ABSTRACT

In one embodiment, a method includes accessing an inverted index of a searchable set of objects including key words. The inverted index includes multiple lists each corresponding to a particular key word and identifying a particular subset of the objects including the particular key word. The method includes generating a binary decision diagram (BDD) for each of one or more of the lists. The BDD corresponds to the particular key word of the list, and each decision node of the BDD represents an object in the searchable set of objects including the particular key word of the list. The method includes storing each of one or more of the lists as its BDD. Storage of the BDD facilitates more efficient storage of the inverted index.

22 Claims, 2 Drawing Sheets

(56) References Cited

OTHER PUBLICATIONS

Makinouchi et al.; "Toward the Information Base Model and Its Implementation Technique for Avanced Applications"; Study Report of IPSJ, Japan; Information Processing of Japan, vol. 96, No. 11; pp. 147-156, Jan. 25, 1996.

Inoue et al.; "Disk Storage Design of Shared Indices and Its Application toTransitive Closure Compputation"; Study Report of IPSJ, Japan; Information Processing Society of Japan, vol. 96, No. 11; pp. 123-130, Jan. 25, 1996.

* cited by examiner

EFFICIENT INDEXING USING COMPACT DECISION DIAGRAMS

RELATED APPLICATION

This Application claims the benefit, under 35 U.S.C. §119 (e), of Provisional U.S. Patent Application No. 60/899874, filed 7 Feb. 2007.

TECHNICAL FIELD

This disclosure relates generally to data structures for searching objects, such as web pages in the World Wide Web.

BACKGROUND

Binary decision diagrams (BDDs) have a variety of potential applications, since BDDs are useful in many areas of computer science. However, BDDs tend to suffer from space blowup. Even in the absence of space blowup, BDDs often run a significant risk of becoming too large for many applications.

DESCRIPTION OF EXAMPLE EMBODIMENTS

Figure 1:
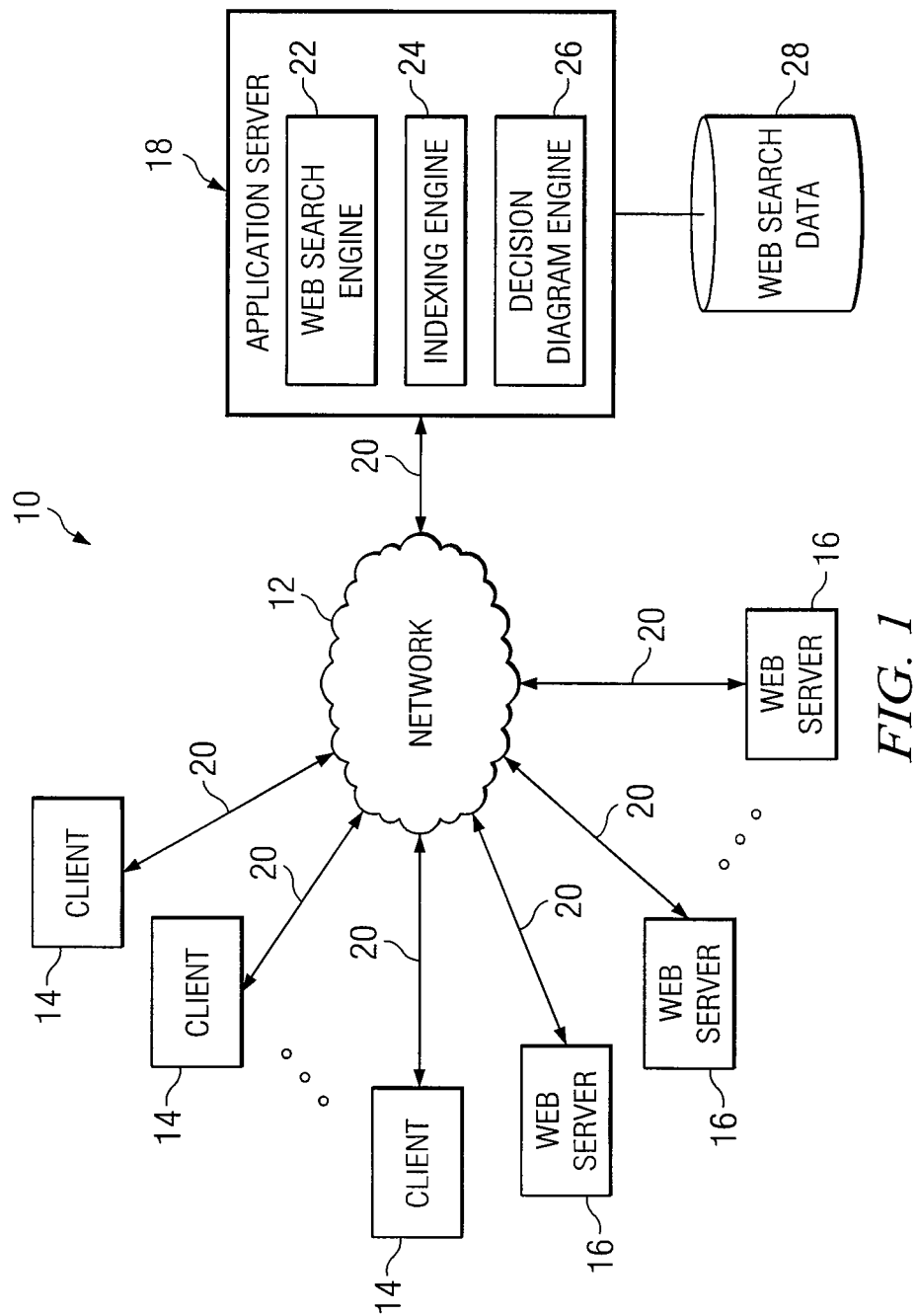
FIG. 1 illustrates an example system for efficient indexing using compact decision diagrams.

FIG. 1 illustrates an example system 10 for efficient indexing using compact decision diagrams. System 10 includes a network 12 coupling one or more clients 14, one or more web servers 16, and an application server 18 to each other. In particular embodiments, network 12 is an intranet, an extranet, a virtual private network (VPN), a local area network (LAN), a wireless LAN (WLAN), a wide area network (WAN), a metropolitan area network (MAN), a portion of the Internet, or another network 12 or a combination of two or more such networks 12. The present disclosure contemplates any suitable network 12. One or more links 20 couple a client 14, a web server 16, or application server 18 to network 12. In particular embodiments, one or more links 20 each include one or more wireline, wireless, or optical links 20. In particular embodiments, one or more links 20 each include an intranet, an extranet, a virtual private network (VPN), a LAN, a WLAN, a WAN, a MAN, a portion of the Internet, or another link 20 or a combination of two or more such links 20. The present disclosure contemplates any suitable links 20 coupling clients 14, web servers 16, and application server 18 to network 12.

In particular embodiments, a client 14 enables a user at client 14 to access web pages residing at web servers 16. As an example and not by way of limitation, a client 14 may be a computer system (such as a suitable desktop computer system, notebook computer system, or mobile telephone) having a web browser. A user at client 14 may enter a Uniform Resource Locator (URL) or other address directing the web browser to a web server 16, and the web browser may generate a Hyper Text Transfer Protocol (HTTP) request and communicate the HTTP request to web server 16. Web server 16 may accept the HTTP request and generate and communicate to client 14 a Hyper Text Markup Language (HTML) document responsive to the HTTP request. The HTML document from web server 16 may be a web page the web browser at client 14 may present to the user. The present disclosure contemplates any suitable web pages. As an example and not by way of limitation, a web page may be an Extensible Markup Language (XML) document or an Extensible Hyper-Text Markup Language (XHTML) document. Moreover, the present disclosure contemplates any suitable objects and is not limited to web pages residing at web servers 16. As an example and not by way of limitation, where appropriate, the present disclosure contemplates executables, files (such as, for example, MICROSOFT WORD documents and Portable Document Format (PDF) documents), or other objects residing at database servers, file servers, peer-to-peer networks, or elsewhere. In particular embodiments, a web server 16 includes one or more servers. The present disclosure contemplates any suitable web servers 16. Moreover, the present disclosure contemplates any suitable clients 14. As an example and not by way of limitation, in addition or as an alternative to having a web browser for accessing web pages residing at web servers 16, a client 14 may have one or more applications for accessing objects residing at one or more database servers, file servers, peer-to-peer networks, or elsewhere.

In response to input from a user at a client 14, client 14 may generate a query for web pages containing one or more particular key words and communicate the query to application server 18. In particular embodiments, application server 18 includes a hardware, software, or embedded logic component or a combination of two or more such components for receiving and responding to queries from clients 14. As an example and not by way of limitation, application server 18 may receive from a client 14 a query for web pages containing one or more particular key words, accept the query, and access web search engine 22 to run the query and generate search results responsive to the query. Web search engine 22 may then run the query and generate and return the search results, and application server 18 may communicate the search results to client 14 for presentation to the user. In particular embodiments, application server 18 includes one or more servers. The present disclosure contemplates any suitable application server 18. As an example and not by way of limitation, application server 18 may include a catalog server providing a point of access enabling users at clients 14 to centrally search for objects across a distributed network, such as an intranet or an extranet.

In particular embodiments, web search engine 22 includes a hardware, software, or embedded logic component or a combination of two or more such components for generating and returning search results identifying web pages responsive to queries from clients 14. The present disclosure contemplates any suitable web search engine 22. As an example and not by way of limitation, web search engine 22 may be BAIDU, GOOGLE, LIVE SEARCH, or YAHOO! SEARCH. In particular embodiments, to run a query and generate search results responsive to the query, web search engine 22 accesses web search data 28. As an example and not by way of limitation, web search data 28 may include inverted indexes of web pages residing at web servers 16. The inverted indexes may each includes sets of lists that may each correspond to a unique key word, as described below. Indexing engine 24 may generate one or more of the inverted indexes, and decision diagram engine 26 may generate decision diagrams (such as compact decision diagrams) representing lists of the inverted indexes, as described below. The decision diagrams may compress the lists to facilitate storage or processing. Indexing engine 24, decision diagram engine 26, or both collectively may manipulate inverted indexes or their lists (as described below) to facilitate queries run by web search engine 22 and the generation of search results. In particular embodiments, indexing engine 24 includes a hardware, software, or embedded logic component or a combination of two or more such components for generating and manipulating inverted indexes. In particular embodiments, decision diagram engine 26 includes a hardware, software, or embedded logic component or a combination of two or more such components for generating decision diagrams representing lists of inverted indexes and manipulating the represented lists. In particular embodiments, web search engine 22, indexing engine 24, and decision diagram engine 26 are all logically or physically separate from each other. In particular embodiments, web search engine 22 and indexing engine 24 are functionally, logically, or physically combined with each other. As an example and not by way of limitation, indexing engine 24 may functionally, logically, or physically include web search engine 22. In particular embodiments, indexing engine 24 and decision diagram engine 26 are functionally, logically, or physically combined with each other. As an example and not by way of limitation, indexing engine 24 may functionally, logically, or physically include decision diagram engine 26. The present disclosure contemplates any suitable functional, logical, or physical arrangement among web search engine 22, indexing engine 24, and decision diagram engine 26.

Figure 2:
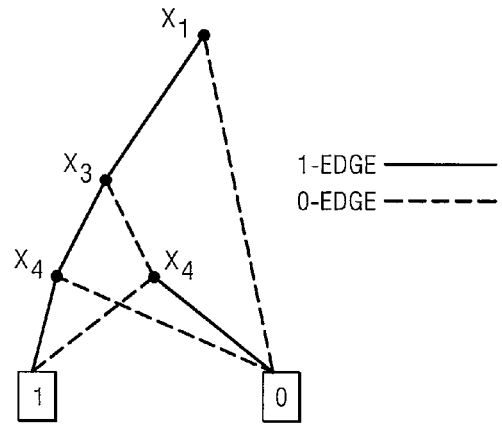
FIG. 2 illustrates an example BDD.

In particular embodiments, a BDD is a rooted directed acyclic graph (DAG) representing a Boolean function. The DAG includes decision nodes (one being a root node) and two terminal nodes, a 0 terminal and a 1 terminal. The terminal nodes represent Boolean functions 1 and 0. Each decision node represents a subfunction $f$, has a Boolean variable v as a label, and has an outgoing 1 edge and an outgoing 0 edge pointing to child nodes. The 1 edge points to a sub BDD representing the function $v \cdot f$, and the 0 edge points to a sub BDD representing the function $\bar{v} \cdot f$. Put another way, the 0 edge represents an assignment of v to 1, and the 0 edge represents an assignment of v to 0. The two edges point to different nodes. A path from the root node of the BDD to the 1 terminal represents a set of variable assignments setting the represented Boolean function to 1. A path from the root node of the BDD to the 0 terminal represents a set of variable assignments setting the represented Boolean function to 0. FIG. 2 illustrates an example BDD representing the function $f=x_1 x_3 x_4 + x_1 \bar{x}_3 \bar{x}_4$. In particular embodiments, isomorphic subgraphs should not be present in a BDD and the order of the variables from the root node of the BDD to a terminal node should be the same for all paths. Such a BDD is a reduced ordered BDD (ROBDD). Herein, reference to a BDD encompasses an ROBDD, and vice versa, where appropriate. Moreover, reference to a BDD encompasses a partitioned ordered binary decision diagram (POBDD), and vice versa, where appropriate. In particular embodiments, for simplicity, a BDD excludes a node if both edges of the node point to the same node. In particular embodiments, a BDD excludes a node if the node is a negative literal. A BDD that excludes negative literals is a zero-suppressed decision diagram (ZDD). Herein, reference to a BDD encompasses a ZDD, and vice versa, where appropriate. The present disclosure contemplates any suitable decision diagrams. In particular embodiments, representing a list (such as a list of an inverted index) using a decision diagram involves mapping elements of the list to a Boolean function and efficiently storing the resulting decision diagram on disk.

Particular embodiments facilitate storing a BDD more efficiently. In particular embodiments, storing a BDD more efficiently enables a central processing unit (CPU) cache to store more nodes of the BDD, which facilitates processing of the BDD by the CPU. Particular embodiments facilitate reducing the number of bytes required by each node of a graph representing a BDD, which facilitates reducing the size of the BDD. Particular embodiments facilitate reducing the size of a BDD without reducing the number of nodes of the BDD. Particular embodiments facilitate reducing the size a BDD while keeping the BDD useful for functional manipulation. Particular embodiments facilitate using BDDs in mobile consumer applications, which often require the compression of data.

As described above, decision diagram engine 26 generates BDDs. In particular embodiments, to compact a BDD (which may be a compact or nano decision diagram (nanoDD)) decision diagram engine 26 discards variable ordering and correlates a location specified by a pointer to both the value of the pointer and the position of the parent node. Under such conditions, in particular embodiments, the minimum information required for each child node of a BDD having 32 nodes is:

Variable ID: 5 bits
0-edge negated flag: 1 bit
THEN/ELSE pointers: $2*\lceil \log(S) \rceil$ bits The term S represents the number of nodes of the BDD. The variable ID labels the node, and labels for 32 nodes requires at least five bits, since $2^5=32$. THEN/ELSE pointers point to child nodes. In particular embodiments, a THEN pointer is a 1-edge pointer and an ELSE pointer is a 0-edge pointer. In particular embodiments, the 0-edge negated flag indicates whether zero suppression negates the node. If the decision diagram is a ZDD, the node structure need not include a 0-edge negated flag. Decision diagram engine 26 identifies a number of bytes each node of the BDD requires, which in particular embodiments is $$\left\lfloor \frac{((5+1+2*\lceil \log(S) \rceil)+7)}{8} \right\rfloor.$$

Particular embodiments store the BDD assuming a customized node structure for the BDD. In particular embodiments, nanoDDs generated by decision diagram engine 26 are zero-suppressed nano binary decision diagrams (nanoZDDs).

In particular embodiments, to further compact the BDD, decision diagram engine 26 drops the log(S) bits for the THEN/ELSE pointers and correlates the value of each pointer and the value (or position) of its parent node to the location the pointer points to. Under such conditions, allotting only one or two bytes to each pointer reduces per-node memory requirements. In particular embodiments, any suitable decision diagram is capable of compacting, with decision diagram engine 26 appropriately resizing tables (and allocated more bits per node) for storing the decision diagram as it becomes larger. However, decision diagram engine 26 starts building the decision diagram as a compact decision diagram. In particular embodiments, instead of resizing, decision diagram engine 26 directly applies decomposition/composition to graph construction to directly convert a compact decision diagram to an unreduced diagram. In particular embodiments, a compact decision diagram facilitates communication between parallel platforms. As an example and not by way of limitation, a first platform may generate a decision diagram, make the decision diagram compact for communication to a second platform operating parallel to the first, and communicate the compact decision diagram to the second platform. The second platform may reconstruct the decision diagram from the compact decision diagram for processing at the second platform. In particular embodiments, nanoDDs are useful in any suitable application of BDDs, e.g., integrated circuit (IC) synthesis, IC formal verification, etc. In particular embodiments, nanoDDs support any suitable BBD operations.

Particular embodiments use BDDs to implement inverted indexes for a search engine (such as web search engine 22) or similar application. In particular embodiments, using BDDs to implement an inverted index facilitates storing the inverted index more efficiently. Particular embodiments facilitate storing the inverted index more efficiently without adversely affecting desirable manipulation properties of the inverted index. In particular embodiments, using BDDs to implement an inverted index facilitates manipulation of the inverted index.

As described above, indexing engine 24 generates inverted indexes. In particular embodiments, an inverted index is a data structure that operates on a set of documents or other objects (such as, for example, web pages in the World Wide Web) to identify one or more subsets of the documents that include one or more key words. As an example and not by way of limitation, the key words may represent a query a user has submitted to a Web search engine. Particular embodiments may store an inverted index as a set of lists, and the lists may each correspond to a unique keyword $w_i$ and include numerical identifiers of documents containing $w_i$. An inverted index often has a tendency to become very large as it builds, with direct implications on storage-space requirements and access time. In particular embodiments, indexing engine 24, decision diagram engine 26, or both compress the lists of the inverted index for storage, allowing for quick and incremental decompression of the lists, according to particular needs.

In particular embodiments, an efficient scheme for compressing lists for quick decompression is based on γ-codes. In a γ-code, an integer x>0 is factored into $2^e+m$, where $e=\lfloor \log_2 x \rfloor$. The code of x is the concatenation of (e+1) in unary with m in binary. As an example, if the code for x=13 is computed, then e=3, m=5, and $x=2^3+5$. The unary representation of (e+1) is 1110, and therefore the γ-code for x is 1110101. An advantage of γ-codes is they require exactly $1+2\lfloor \log_2 x \rfloor$ bits to represent x, which provides significant savings compared with fixed-length binary representation when x is on average relatively small.

In particular embodiments, γ-codes are used as follows in the context of lists. The elements of the list are sorted, and the pairwise differences between consecutive entries are γ encoded. As an example and not by way of limitation, to compress the list [23,125,37,54,86,33], the sorted list and the pairwise-differences list may be:

| Sorted: | [23,33,37,54,86,125] |
| Pairwise differences: | [23,10,4,17,32,39] |

The γ-encoded list therefore may be:

[111100111,1110010,11000,111100001,11111000000,11111000111]

As an example and not by way or limitation, consider the list [23,33,37,54]. In binary, the elements of the list are [010111,100001,100101,110110]. For binary encoding, to obtain a Boolean function that represents the list with a minimum number of variables, each variable may be assigned to each significant bit weight. A function corresponding to the above list may be:

$$f = \bar{x}_1 x_2 \bar{x}_3 x_4 x_5 x_6 + x_1 \bar{x}_2 \bar{x}_3 x_4 \bar{x}_5 x_6 + x_1 x_2 \bar{x}_3 x_4 \bar{x}_5 \bar{x}_6$$

For linear encoding, to obtain an alternative representation, a different variable may be assigned to each document ID. Such representation may be impractical though, since a very large number of document may be involved. Moreover, node sharing may be impossible unless a single Boolean function represents multiple lists.

For base-$2^k$ encoding, the list elements may be represented in a $2^k$ base and linear and binary encoding may then be combined. $2^k$ distinct variables may be used to represent the each of the base-$2^k$ digits in a one-hot manner. As an example and not by way of limitation, to encode the number 54 (which is 312 in base-4) each of the digits may be one-hot encoded, obtaining 1000:0010:0100. Therefore, element 54 may be encoded as $g = x_1 \bar{x}_2 \bar{x}_4 \bar{x}_5 x_6 x_7 \bar{x}_8 \bar{x}_9 x_{10} \bar{x}_{11} \bar{x}_{12}$. The increase in the number of variables may seem inefficient, but it in fact may lead to better sharing and more compact representation, especially with ZDDs, which as described above store negative literals more efficiently.

For each list, a corresponding Boolean function may be constructed and a BDD (which preferably may be a ZDD since they store negative literals more efficiently) may be built for the Boolean function using a suitable BDD package. Let n be the number of variables and d be the number of nodes in the BDD. For each node of the BDD, $S_n = \lceil \log(n) \rceil$ bits may be sufficient to index a variable labeling the node and $S_d = \lceil \log(d) \rceil$ bits may be sufficient to identify its location. Accordingly, each node in a nanoDD may be structured as:

| variable: $s_n$ bits | 1 edge: $s_d$ bits | 0 edge: $s_d$ bits |

A single nanoDD node may require exactly $2s_d + s_n$ bits. Nodes may be stored consecutively in memory or on disk in the order depth-first traversal would visit them, with 0 edges followed before 1 edges. Accordingly, information may be incrementally extracted from a nanoDD on disk. Terminal nodes need not be explicitly stored, since they may be assigned fixed "virtual" positions.

One approach to compacting an index (forward or inverted) of web pages involves encoding in binary the page IDs and the key word IDs in the index and adding each {page_ID, key_word_ID} as a minterm to a decision diagram representing the index. Such an approach tends to parse web pages for indexing very slowly. Another approach to compacting an index of web pages involves encoding in binary the page IDs in the index and building a separate decision diagram for each key word in the index. Such an approach tends to compact the index less than the previous approach, but works significantly faster. Yet another approach to compacting an index of web pages involves building a decision diagram for each key word in the index (the decision diagram representing the set of web pages containing the word) and discarding the idea of sharing among all the decision diagrams. Each decision diagram includes approximately a few tens to a few thousands of nodes. The size of the decision diagram is known after it is built. The minimum information required for each node is:

Variable ID: 5 bits
0-edge negated flag: 1 bit
THEN/ELSE pointers: $2 * \lceil \log(S) \rceil$ bits The term S represents the number of nodes of the decision diagram. For each decision diagram, decision diagram engine 26 identifies the number of bytes each node of the decision diagram requires, which is $$\left\lfloor \frac{((5 + 1 + 2 * \lceil \log(S) \rceil) + 7)}{8} \right\rfloor.$$

Alternatively, if the decision diagram is a ZDD, the node structure need not include a 0-edge negated flag. Decision diagram engine 26 stores each decision diagram assuming a customized node structure for the decision diagram. Such an approach tends to compact the index significantly more than the two previous approaches. In particular embodiments, for each key word in the decision diagram, decision diagram engine 26 compares the size (in terms of memory requirements) of the decision diagram with the size (in terms of memory requirements) of the list represented by the decision diagram and stores the smaller of the two. Particular embodiments increase space efficiency of inverted indexes. Particular embodiments facilitate complex Boolean operations on inverted indexes for search results. Particular embodiments facilitate implementation of inverted indexes for mobile applications, where compression is often particularly useful.

Conjunction is a common operation between or among K ordered lists. A conjunction may be implemented as a K-way merge. Elements may be read one at a time, starting from the head of the lists and proceeding through the lists until having detected all common elements. As an example and not by way of limitation, the common elements between the two following lists may be detected:

| list1: | 10, 20, 23, 36, 47, 52 |
| list2: | 16, 18, 23, 47 |

Pointer $p_1$ points to elements of list1 and pointer $p_2$ points to elements of list2. Initially $p_1$ points to 10 in list1 and $p_2$ points to 16 in list2. Because $p_1$ points to a smaller element than $p_2$ points to, $p_1$ advances to 20, the next element in list1. Now $p_2$ points to a smaller element than $p_1$ points to, so $p_2$ advances to 18, the next element in list2. Because 18 is smaller than 20, $p_2$ advances to 23 in list2. Then $p_1$ advances to 23 in list1. Pointers $p_1$ and $p_2$ now point to a first common element, and the operation outputs the first common element, which is 23. Then $p_1$ advances to 36 in list1 and $p_2$ advances to 47 in list2. Pointer $p_1$ now points to a smaller element than $p_2$ points to, so $p_1$ advances to 47 in list1. Pointers $p_1$ and $p_2$ point to a second common element, and the operation outputs the second common element, which is 47. Because pointer $p_2$ has reached the end of list2, there are no more common elements and the operations ends.

A basic operation for traversing lists is get_next_element (L). For nanoDDs, particular embodiments efficiently implement the operation get_next_element_greq(L,element) to detect a next element in list L that is greater than or equal to element. To implement get_next_element_greq(L,element), particular embodiments maintain an array of variable assignments A for a nanoDD and update the array while traversing the nanoDD. To obtain the first element stored in the nanoDD, the operation performs a depth-first traversal starting from the root of the nanoDD. The operation follows 0 edges first and proceeds until the operation reaches the 1 terminal of the nanoDD. For each visited node, the operation monitors the variable ID of the node and the ID of the edge leading to the node. The operation initially assigns the value 0 to variables not appearing in the path from the root of the nanoDD to the 1 terminal.

Figure 3:
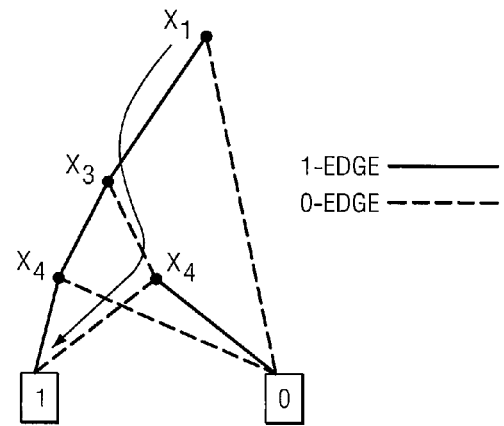
FIG. 3 illustrates an example traversal of the BDD.
Figure 4:
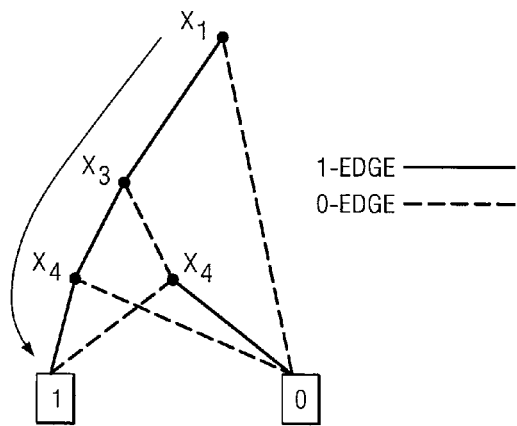
FIG. 4 illustrates another traversal of the BDD.

In particular embodiments, when indexing engine 24 or decision diagram engine 26 calls get_next_element_greq(L, element), the operation compares the binary representation of element with array A and detects the number of common variable assignments from the root. The operation backtracks until it reaches the first noncommon variable from the top (or the root if there are no common assignments) and traverses the nanoDD according to the remaining assignments imposed by element. As an example and not by way of limitation, consider the operation of get_next_element_greq (L,element) on the decision diagram illustrated by FIG. 2. As described above, the decision diagram illustrated by FIG. 2 represents the function $f=x_1x_3x_4+x_1\overline{x}_3\overline{x}_4$. The decision diagram therefore encodes the list [8,11,12,15]. FIG. 3 illustrates an example traversal of the decision diagram obtaining the first element of the encoded list. The variable assignments from the traversal are $(x_1,x_2,x_3,x_4)=(1,0,0,0)$, which yields 8, the first element of the list. To access the next element of the list, the operation searches for the next element greater than 8 with get_next_element_greq(L,9). The operation then backtracks to variable $x_3$ (since the first three variable assignments between (1,0,0,0) and (1,0,0,1) are the same) and continues along the path illustrated by FIG. 4. The variable assignments from the traversal are (1,0,1,1), which yields 11. The operation similarly obtains the remaining elements of the list.

In particular embodiments, using decision diagrams for searches as described above enables the searches to skip elements of underlying lists when the presence of the skipped elements is unimportant. As an example and not by way of limitation, consider the conjunction between the lists [8,11, 12,15] and [7,13,15]. The operation may obtain the first elements of both lists. Since 8 is larger than 7, the operation may search the second list for the next element greater than or equal to 8, which leads to 13. The operation may then run get_next_element_greq(L,13) on the first list. The operation may detect that (1,1,0,1) (which is 13 in binary) has only its first variable in common with (1,0,0,0), which is 8 in binary. The operation may then backtrack directly to variable $x_1$ and traverse down the nanoDD consistent with the requested assignment (1,1,0,1), eventually ending up at (1,1,1,1).

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A method comprising:
   accessing an inverted index of a searchable set of objects comprising key words, the inverted index comprising a plurality of lists each corresponding to a particular key word and identifying a particular subset of the objects comprising the particular key word;
   generating a binary decision diagram (BDD) for each of one or more of the lists, the BDD corresponding to the particular key word of the list, each decision node of the BDD representing an object in the searchable set of objects comprising the particular key word of the list; and
   storing each of one or more of the lists as its BDD, storage of the BDD facilitating more efficient storage of the inverted index, wherein storing a BDD comprises storing for each of its nodes only a variable ID of the node that uniquely labels the node, a 0-edge negated flag, and THEN/ELSE pointers using a minimum number of bits for a size of the BDD.

2. The method of claim 1, wherein one or more of the BDDs are zero-suppressed nano binary decision diagrams (nanoZDDs).

3. The method of claim 1, wherein one or more of the BDDs are partitioned ordered binary decision diagrams (POBDDs).

4. The method of claim 1, wherein one or more of the BDDs have customized node structures.

5. The method of claim 1, wherein the objects are web pages and a web search engine uses the stored BDDs to generate search results.

6. A method comprising:
accessing a binary decision diagram (BDD) representing a list of an inverted index of a searchable set of objects comprising key words, the list corresponding to a particular key word and identifying a particular subset of the objects comprising the particular key word, the BDD corresponding to the particular key word of the list, each decision node of the BDD representing an object in the searchable set of objects comprising the particular key word of the list;
determining elements of the list by:
traversing the BDD depth first along one or more paths to terminal node 1 of the BDD following 0 edges of decision nodes of the BDD first; and
assigning a set of values to an array of variables for the elements of the list according to each of the paths traversed; and
using the determined elements of the list to calculate a conjunction between the list and one or more other lists of the inverted index.

7. The method of claim 6, wherein determining a first element of the list comprises:
traversing the BDD depth first along a first path from a root node of the BDD to terminal node 1 of the BDD following 0 edges of decision nodes of the BDD first; and
assigning a 1 to each variable in the array corresponding to a decision node of the BDD having a 1 edge in the first path, and assigning a 0 to each variable in the array corresponding to a decision node of the BDD having a 0 edge in the first path or corresponding to a decision node excluded from the BDD.

8. The method of claim 6, wherein the BDD is a zero-suppressed nano binary decision diagram (nanoZDD).

9. The method of claim 6, wherein one or more of the BDDs are partitioned ordered binary decision diagrams (POBDDs).

10. The method of claim 6, wherein the objects are web pages.

11. One or more non-transitory computer-readable media encoding software operable when executed to:
access an inverted index of a searchable set of objects comprising key words, the inverted index comprising a plurality of lists each corresponding to a particular key word and identifying a particular subset of the objects comprising the particular key word;
generate a binary decision diagram (BDD) for each of one or more of the lists, the BDD corresponding to the particular key word of the list, each decision node of the BDD representing an object in the searchable set of objects comprising the particular key word of the list; and
store each of one or more of the lists as its BDD, storage of the BDD facilitating more efficient storage of the inverted index, wherein storing a BDD comprises storing for each of its nodes only a variable ID of the node that uniquely labels the node, a 0-edge negated flag, and THEN/ELSE pointers using a minimum number of bits for a size of the BDD.

12. The computer-readable media of claim 11, wherein one or more of the BDDs are zero-suppressed nano binary decision diagrams (nanoZDDs).

13. The computer-readable media of claim 11, wherein one or more of the BDDs are partitioned ordered binary decision diagrams (POBDDs).

14. The computer-readable media of claim 11, wherein one or more of the BDDs have customized node structures.

15. The computer-readable media of claim 11, wherein the objects are web pages and a web search engine uses the stored BDDs to generate search results.

16. One or more non-transitory computer-readable media encoding software operable when executed to:
access a binary decision diagram (BDD) representing a list of an inverted index of a searchable set of objects comprising key words, the list corresponding to a particular key word and identifying a particular subset of the objects comprising the particular key word, the BDD corresponding to the particular key word of the list, each decision node of the BDD representing an object in the searchable set of objects comprising the particular key word of the list;
determine elements of the list by:
traversing the BDD depth first along one or more paths to terminal node 1 of the BDD following 0 edges of decision nodes of the BDD first; and
assigning a set of values to an array of variables for the elements of the list according to each of the paths traversed; and
use the determined elements of the list to calculate a conjunction between the list and one or more other lists of the inverted index.

17. The computer-readable media of claim 16, wherein determining a first element of the list comprises:
traversing the BDD depth first along a first path from a root node of the BDD to terminal node 1 of the BDD following 0 edges of decision nodes of the BDD first; and
assigning a 1 to each variable in the array corresponding to a decision node of the BDD having a 1 edge in the first path, and assigning a 0 to each variable in the array corresponding to a decision node of the BDD having a 0 edge in the first path or corresponding to a decision node excluded from the BDD.

18. The computer-readable media of claim 16, wherein the BDD is a zero-suppressed nano binary decision diagram (nanoZDD).

19. The computer-readable media of claim 16, wherein one or more of the BDDs are partitioned ordered binary decision diagrams (POBDDs).

20. The computer-readable media of claim 16, wherein the objects are web pages.

21. A system comprising:
means for accessing an inverted index of a searchable set of objects comprising key words, the inverted index comprising a plurality of lists each corresponding to a particular key word and identifying a particular subset of the objects comprising the particular key word;
means for generating a binary decision diagram (BDD) for each of one or more of the lists, the BDD corresponding to the particular key word of the list, each decision node of the BDD representing an object in the searchable set of objects comprising the particular key word of the list; and
means for storing each of one or more of the lists as its BDD, storage of the BDD facilitating more efficient storage of the inverted index, wherein storing a BDD comprises storing for each of its nodes only a variable ID of the node that uniquely labels the node, a 0-edge negated flag, and THEN/ELSE pointers using a minimum number of bits for a size of the BDD.

22. A system comprising:
- means for accessing a binary decision diagram (BDD) representing a list of an inverted index of a searchable set of objects comprising key words, the list corresponding to a particular key word and identifying a particular subset of the objects comprising the particular key word, the BDD corresponding to the particular key word of the list, each decision node of the BDD representing an object in the searchable set of objects comprising the particular key word of the list;
- means for determining elements of the list by:
  - traversing the BDD depth first along one or more paths to terminal node 1 of the BDD following 0 edges of decision nodes of the BDD first; and
  - assigning a set of values to an array of variables for the elements of the list according to each of the paths traversed; and
- means for using the determined elements of the list to calculate a conjunction between the list and one or more other lists of the inverted index.

\* \* \* \* \*